(12) United States Patent
Numao et al.

(10) Patent No.: US 9,489,063 B2
(45) Date of Patent: Nov. 8, 2016

(54) INFORMATION PROCESSING APPARATUS AND COMPUTER-READABLE STORAGE MEDIUM

(71) Applicant: CASIO COMPUTER CO., LTD., Shibuya-ku, Tokyo (JP)

(72) Inventors: Kouichi Numao, Fujima (JP); Keiichi Tanioka, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/410,026

(22) PCT Filed: Jun. 6, 2013

(86) PCT No.: PCT/JP2013/066290
§ 371 (c)(1),
(2) Date: Dec. 19, 2014

(87) PCT Pub. No.: WO2013/191069
PCT Pub. Date: Dec. 27, 2013

(65) Prior Publication Data
US 2015/0331500 A1    Nov. 19, 2015

(30) Foreign Application Priority Data
Jun. 21, 2012    (JP) .................................. 2012-139535

(51) Int. Cl.
*G06F 3/033* (2013.01)
*G06F 3/0362* (2013.01)
(Continued)

(52) U.S. Cl.
CPC ........... *G06F 3/0362* (2013.01); *G06F 1/1616* (2013.01); *G06F 1/1677* (2013.01);
(Continued)

(58) Field of Classification Search
CPC ..................................................... G06T 3/0362
USPC ......................................................... 345/184
See application file for complete search history.

(56) References Cited

U.S. PATENT DOCUMENTS

2008/0279454 A1* 11/2008 Lev et al. ............. G06F 1/1616
382/181
2009/0091803 A1    4/2009 Chen et al.
(Continued)

FOREIGN PATENT DOCUMENTS

| JP | 2011076267 A | * | 4/2011 |
| JP | 2012004958 A | * | 1/2012 |
| JP | 2012018459 A | * | 1/2012 |

OTHER PUBLICATIONS

Japanese Office Action (and English translation thereof) dated Oct. 2, 2015, issued in counterpart Japanese Application No. 2012-139535.
(Continued)

*Primary Examiner* — Jason Olson
(74) *Attorney, Agent, or Firm* — Holtz, Holtz & Volek PC

(57) ABSTRACT

An information processing apparatus that is openable by a first case and a second case being unfolded, and includes an imaging section which is provided in the second case and opposed to the first case where a read target medium is placed, a recognition section which, when a predetermined indicator on the first case side is photographed by the imaging section, recognizes the predetermined indicator by analyzing a photographed image, a judgment section which judges whether or not the first case and the second case have been closed into a predetermined state, based on a result of recognition of the indicator by the recognition section, and a determination section which determines the photographed image taken by the imaging section as a storage target, when the judgment section judges that the first case and the second case have been closed into the predetermined state.

12 Claims, 7 Drawing Sheets

(51) Int. Cl.
  *H04N 5/357* (2011.01)
  *H04N 5/76* (2006.01)
  *G06F 1/16* (2006.01)
  *H04N 5/225* (2006.01)
  *H04N 1/195* (2006.01)
  *H04N 1/21* (2006.01)
  *H04N 101/00* (2006.01)

(52) U.S. Cl.
  CPC ........ *G06F1/1686* (2013.01); *H04N 1/19594* (2013.01); *H04N 1/2112* (2013.01); *H04N 5/225* (2013.01); *H04N 5/357* (2013.01); *H04N 5/76* (2013.01); *H04N 2101/00* (2013.01); *H04N 2201/218* (2013.01)

(56) References Cited

U.S. PATENT DOCUMENTS

2009/0231483 A1   9/2009   Seddik et al.
2009/0262199 A1   10/2009  Miyamoto et al.

OTHER PUBLICATIONS

International Search Report (ISR) dated Aug. 9, 2013 issued in International Application No. PCT/JP2013/066290.

\* cited by examiner

INFORMATION PROCESSING APPARATUS AND COMPUTER-READABLE STORAGE MEDIUM

TECHNICAL FIELD

The present invention relates to an information processing apparatus which includes an imaging section to photograph information described on a read target medium (for example, notebooks or books) and a computer-readable storage medium.

BACKGROUND ART

In general, regarding an information processing apparatus which reads information described on a read target medium (for example, notebooks or books), the image reading apparatus reads image data by scanning the read target medium with a scanner or reads the photographed image by photographing the read target medium with a digital camera.

Conventionally, as a reading technology in which a read target medium is taken on the digital camera, for example, there has been proposed a technology in which, with respect to a notebook computer whose first case and second case are rotatably (openably and closably) attached via a hinge section, when a document is placed on the keytop of the first case, and the second case including an imaging section is held for a predetermined amount of time at a position where the entire keytop can be photographed, the imaging section is operated to start taking a photo of the document (refer to Patent Literature 1).

However, the technology disclosed by Patent Literature 1 requires a specific operation by which the first case and second case (imaging section) are adjusted to be kept at a predetermined hinge angle and then the second case is held at the predetermined hinge angle for a predetermined amount of time, in order to photograph the document placed on the keytop. As a result, when the first case and second case are completely closed without the aforementioned specific operation being performed, the document is not photographed. Further, even when the user thinks he or she has performed the specific operation for holding the second case for the predetermined amount of time, if the specific operation has not been completely performed, the document is not photographed.

CITATION LIST

Patent Literature

PTL 1: JP 2011-076267

SUMMARY OF INVENTION

An object of the present invention to provide an information processing apparatus which can steadily photograph a read target medium which is placed on the side of either case, by merely carrying out an essential operation in which a first case and a second case are closed.

In accordance with one aspect of the present invention, there is provided an information processing apparatus that is openable by a first case and a second case being unfolded, comprising an imaging section which is provided in the second case and opposed to the first case where a read target medium is placed; a recognition section which, when a predetermined indicator on the first case side is photographed by the imaging section, recognizes the predetermined indicator by analyzing a photographed image; a judgment section which judges whether or not the first case and the second case have been closed into a predetermined state, based on a result of recognition of the indicator by the recognition section; and a determination section which determines the photographed image taken by the imaging section as a storage target, when the judgment section judges that the first case and the second case have been closed into the predetermined state.

In accordance with another aspect of the present invention, there is provided a non-transitory computer-readable medium having stored thereon a program that is executable by a computer, the program being executable by the computer to perform functions comprising: processing for recognizing a predetermined indicator by analyzing a photographed image when the predetermined indicator on a first case side is photographed by an imaging section provided in a second case that is openable to be in an unfolded state and opposed to the first case where a read target medium is placed; processing for judging whether or not the first case and the second case have been closed into a predetermined state, based on a result of recognition of the indicator; and processing for determining the photographed image taken by the imaging section as a storage target, when the first case and the second case are judged to have been closed into the predetermined state.

According to the present invention, the read target medium placed on one side of the cases can securely be photographed merely by carrying out the essential operation of closing the first case and the second case without a specific operation, which makes it possible to prevent a user from forgetting to photograph.

DESCRIPTION OF EMBODIMENTS

Figure 1:
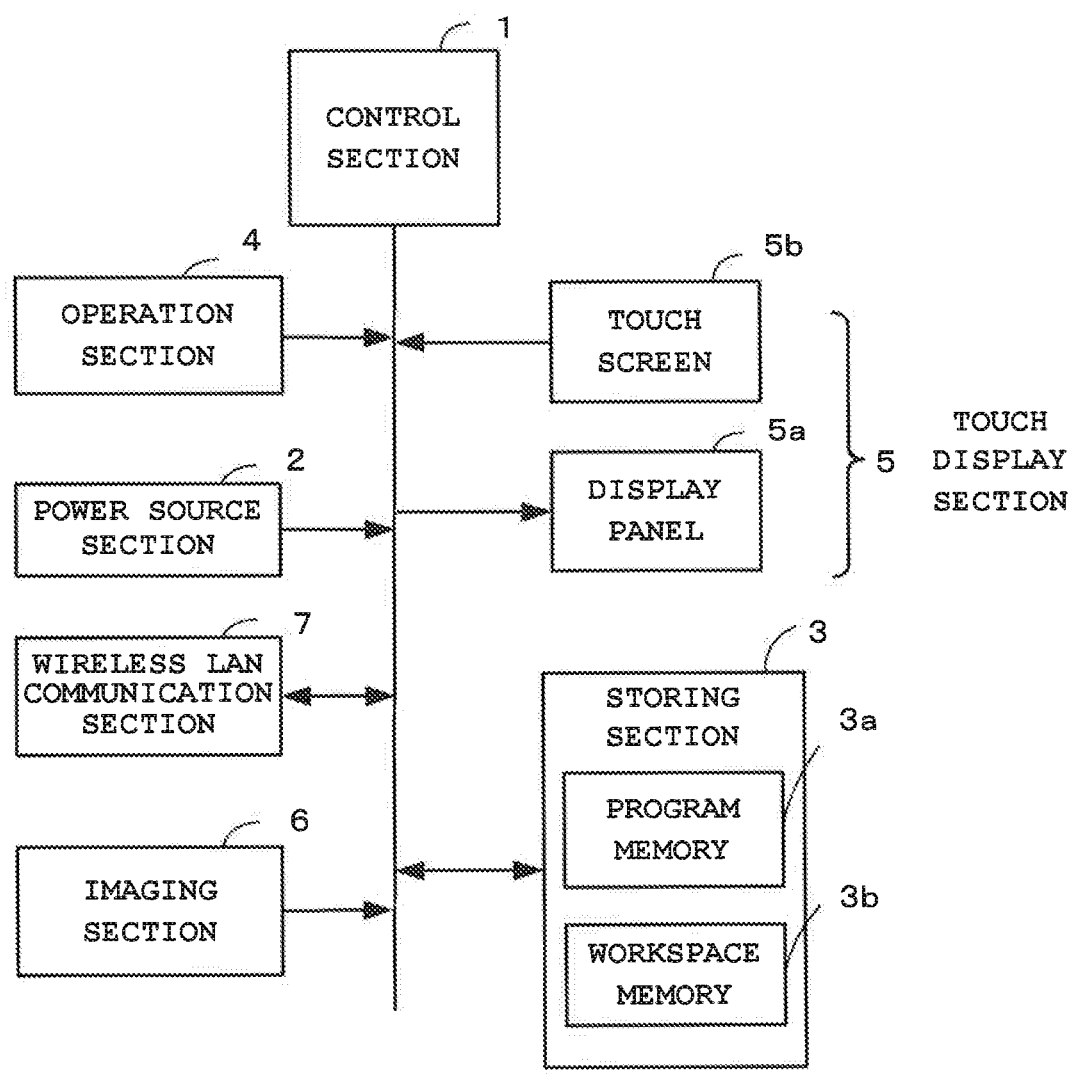
FIG. 1 is a block diagram illustrating basic components of a tablet terminal apparatus with a camera, in which the present invention has been applied as an information processing apparatus.

Hereinafter, the embodiment of the present invention will be described below referring to the FIGS. 1 to 5. This embodiment is exemplified by a case where the present invention is applied as an information processing apparatus to a tablet terminal apparatus having an imaging function (digital camera). FIG. 1 is a block diagram illustrating basic components of the tablet terminal apparatus. The tablet terminal apparatus is structured such that the entire case thereof is a portable information terminal apparatus having, for example, an A5 size, and includes a later-described image reading function to optically read information (characters and diagrams) described on a read target medium (for example, notes, report paper, and books) placed in close proximity of the tablet terminal apparatus, by taking a photo of the read target medium, in addition to basic functions such as a touch input function and a wireless communication function. In the embodiment of the present invention, the read target medium is represented by a medium on which information to be photographed is described, but is not specified by materials made of paper. That is, in the embodiment of the present invention, the read target medium refers to an object on which information is described. Similarly, in the embodiment of the present invention, the read target medium includes electronic paper in which information can electronically be displayed.

A control section 1 is operated by electric power supplied from a power source section (secondary battery) 2, and controls the entire operation of the tablet terminal apparatus in accordance with various programs stored in a storing section 3, and a CPU (Central Processing Unit) and a memory not illustrated are provided in the control section 1. The storing section 3 is constituted by, for example, a ROM and a flash memory, and includes a program memory 3a that stores programs and various applications to realize the embodiment of the present invention in accordance with operation procedures illustrated in FIG. 4, and a workspace memory 3b that temporarily stores various information (for example, flags) necessary for the tablet terminal apparatus to be operated. Note that the storing section 3 may include, for example, a detachable, portable memory (storage media) such as an SD (Secure Digital) card and an IC (Integrated Circuit) card, and may include, although not illustrated, a storage area on a predetermined server device side in a case where the connection to the network is established via a communication function.

An operation section 4 includes, although its illustration is omitted, a power key used to turn on/off a power supply, as a push-button type key, and control section 1 carries out processing in accordance with an input operating signal outputted in response to operated keys on the operation section 4. A touch display section 5 is constituted such that a touch screen 5b is arranged to be layered on a display panel 5a. The display panel 5a is a high definition crystal liquid display having a screen where the aspect ratio differs (for example, 4:3 [width to height]), or an organic electroluminescence (Electro Luminescence) display. The touch screen 5b is constituted by a touch screen which detects the position of a finger of a photographer who touches the touch screen 5b and inputs the coordinate data of the position. For example, an electrostatic capacity method or a resistive membrane method is applied to the touch screen 5b, but another method may be applied.

An imaging section 6, which constitutes an image reading function, includes a taking lens, image sensor elements, various sensors, an analog processing section, and a digital processing section, and serves as a digital camera section in which an object image from an optical lens not shown is formed by image sensor elements such as a CCD (Charge Coupled Device) or a CMOS (Complementary Metal Oxide Semiconductor) and whereby the object is photographed in high definition. The imaging section 6 can perform, for example, consecutive photographing (high speed photographing) with a frame rate of 15 frames per second (15 fps) during the operation of the image reading function. A wireless LAN (Local Area Network) communication section 7 is a wireless communication module which can perform high-speed, large capacity communication and can be connected to a nearest wireless LAN router (not illustrated) via the Internet.

Figure 2:
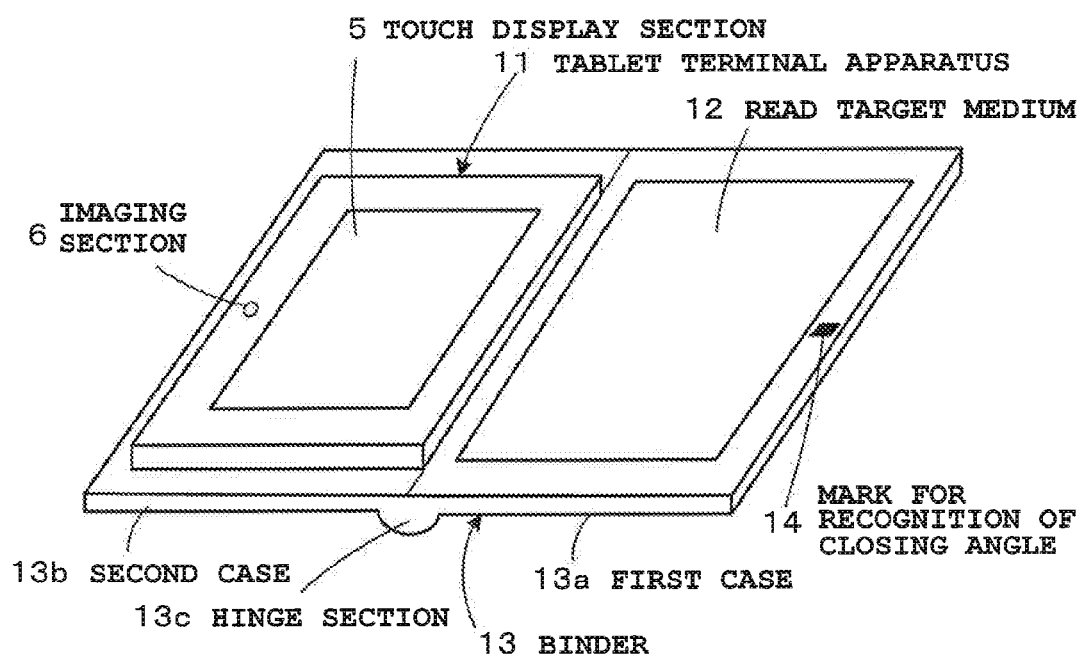
FIG. 2 is an external perspective view illustrating a state where the tablet terminal apparatus 11 with the camera and a read target medium 12 are equipped with a binder 13.

FIG. 2 is an external perspective view illustrating a state where the tablet terminal apparatus 11 with the camera and a read target medium 12 are equipped with a binder 13. The tablet terminal apparatus 11 and the read target medium 12 (for example, notebooks, report paper, and books) are equipped with the binder 13. The binder 13 is constituted such that a first case 13a and a second case 13b are openably and closably attached opposite to each other via a hinge section 13c arranged therebetween. In the example illustrated, the first case 13a is arranged on the right side, and the second case 13b is arranged on the left side. Note that the first case 13a and the second case 13b may be arranged at the inverted position, compared with positional relation illustrated in the diagram. The first case 13a and the second case 13b are made up of a paper member (thick paper) of a thick flat-plate rectangular (identical in shape and size) and openably and closably connected to each other via the hinge section 13c arranged therebetween, in a state where the first case 13a and the second case 13b, both of which are longitudinally extended, are respectively arranged on the left and right sides. That is, the first case 13a and the second case 13b are constituted in such a manner to be openable and closable, centering on the hinge section 13c as a rotation axis.

Also, the first case 13a and the second case 13b are openable and closable, ranging from a state where the angle between the first case 13a and the second case 13b is formed at 180 degrees to a state where the second case 13b fittingly lies on top of the first case 13a (fully closed state). In a state where the binder 13 is opened at 180 degrees, a user can use the tablet terminal apparatus 11 and write characters or depict diagrams on the read target medium 12. Also, when the tablet terminal apparatus 11 and the read target medium 12 are not used, the first case 13a and the second case 13b are closed, thereby fully closing the binder 13.

The whole tablet terminal apparatus 11 is formed in a slim, rectangular parallelepiped, mounted on the second case 13b constituting the binder 13, and arranged in the direction that the tablet terminal apparatus 11 is longitudinally arranged with respect to the longitudinal second case 13b. Also, the read target medium 12 is placed on the other case 13a (first case) constituting the binder 13. The read target medium 12 may be sheet-shaped like a sheet of paper or may be book-shaped like books (state of being bound). Note that positional relation between the tablet terminal apparatus 11 and the read target medium 12 on the binder 13 may be inverted, compared with the description above. Also, the tablet terminal apparatus 11 and the read target medium 12 are detachably mounted on the binder 13, but the way of mounting may be arbitrarily determined. For example, a clasp and a hook may be applied.

Thus, in the state where the tablet terminal apparatus 11 is mounted on the second case 13b of the binder 13, the touch display section 5 and the imaging section 6 of the tablet terminal apparatus 11 are arranged to be positioned on the surface side of the tablet terminal apparatus 11. Further, the imaging section 6 is arranged to be positioned at one end central portion (surface left end central portion on the example in the diagram) on the surface side. Also, a mark 14 as an indicator for recognition of a closing angle is provided at the surface one end central portion (surface right end central portion on the example in the diagram) of the first case 13a constituting the binder 13. The mark 14 for recognition of the closing angle is, for example, printed on the top surface of the first case 13a with a black rectangular mark, but is not limited to the printing. A seal with the mark may be affixed.

Figure 3:
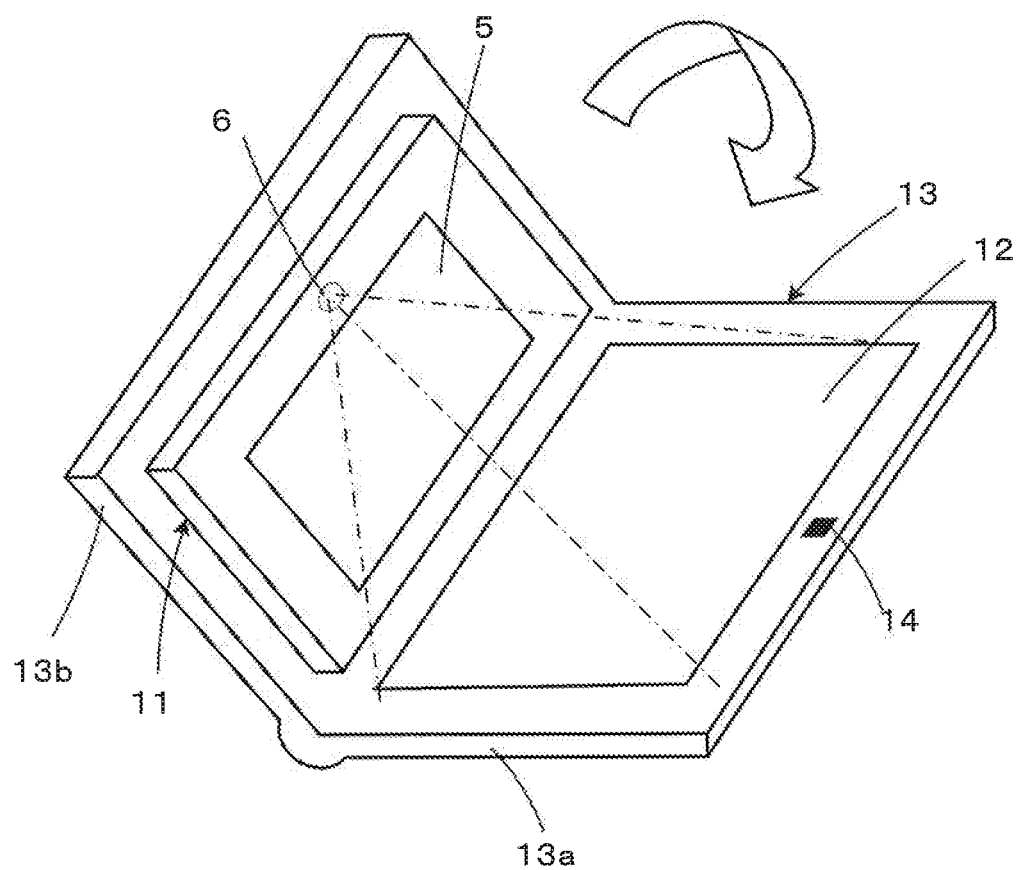
FIG. 3 is a diagram to describe the relation between the read target medium 12 and an image viewing angle of the read target medium 12, which is photographed by an imaging section 6, when a first case 13a and a second case 13b constituting the binder 13 are closed.

FIG. 3 is a diagram to describe the relation between the read target medium 12 and the image viewing angle of the read target medium 12 photographed by the imaging section 6 when the first case 13a and the second case 13b constituting the binder 13 are closed. The viewing angle of the imaging section 6 depends on the closing angle when the binder 13 is closed, and the size of the read target medium 12. In the process during which the binder 13 is gradually closed, in a range in which the read target medium 12 and the mark 14 for recognition of the closing angle can be photographed, the control section 1 obtains a photographed image photographed by the imaging section 6, recognizes the mark 14 for recognition of the closing angle by analyzing the photographed image, and judges whether or not the first case 13a and the second case 13b are closed into a predetermined state (for example, closing angle: approximately 110 degrees) in accordance with the recognition results of the mark 14.

In this case, the closing angle of the binder 13 is gradually decreased as the binder 13 is closed. The photogenic state of the mark 14 changes in proportion to the closing angle, so that the change of the photogenic state is recognized. That is, the control section 1 recognizes the change in shape of the mark 14 in the photographed image and judges whether or not the first case 13a and the second case 13b are closed into the predetermined state (closing angle: approximately 110 degrees) based on whether or not the shape of the mark 14 is changed from a trapezoid to a square. Accordingly, when the first case 13a and the second case 13b are closed into the predetermined state, the control section 1 recognizes that the angle between the first case 13a and the second case 13b has reached an optimal angle for photographing and determines the photographed image taken by the imaging section 6 as a storage target. When the control section 1 recognizes the change in shape of the mark 14 for recognition of the closing angle and detects an approximately 110 degrees as the optimal angle for photographing, the control section 1 determines the photographed image taken by the imaging section 6 as a storage target. In this case, the photographing conditions such as focusing and exposure are set in accordance with the optimal angle for the photographing (approximately 110 degrees), and the image photographed under these conditions is obtained from the imaging section 6 as a storage target.

Next, the operation concept of the tablet terminal apparatus 11 according to the embodiment of the present invention will be described referring to a flowchart illustrated in FIG. 4. Here, each function described in this flowchart is stored in the form of readable program code, and operations according to the program code are sequentially performed. Also, operations according to the program code transmitted via a transmission medium such as a network can be sequentially performed. That is, an operation unique to the present embodiment can be performed by using a program/data externally supplied via not only a recording medium but also a transmission medium.

Figure 4:
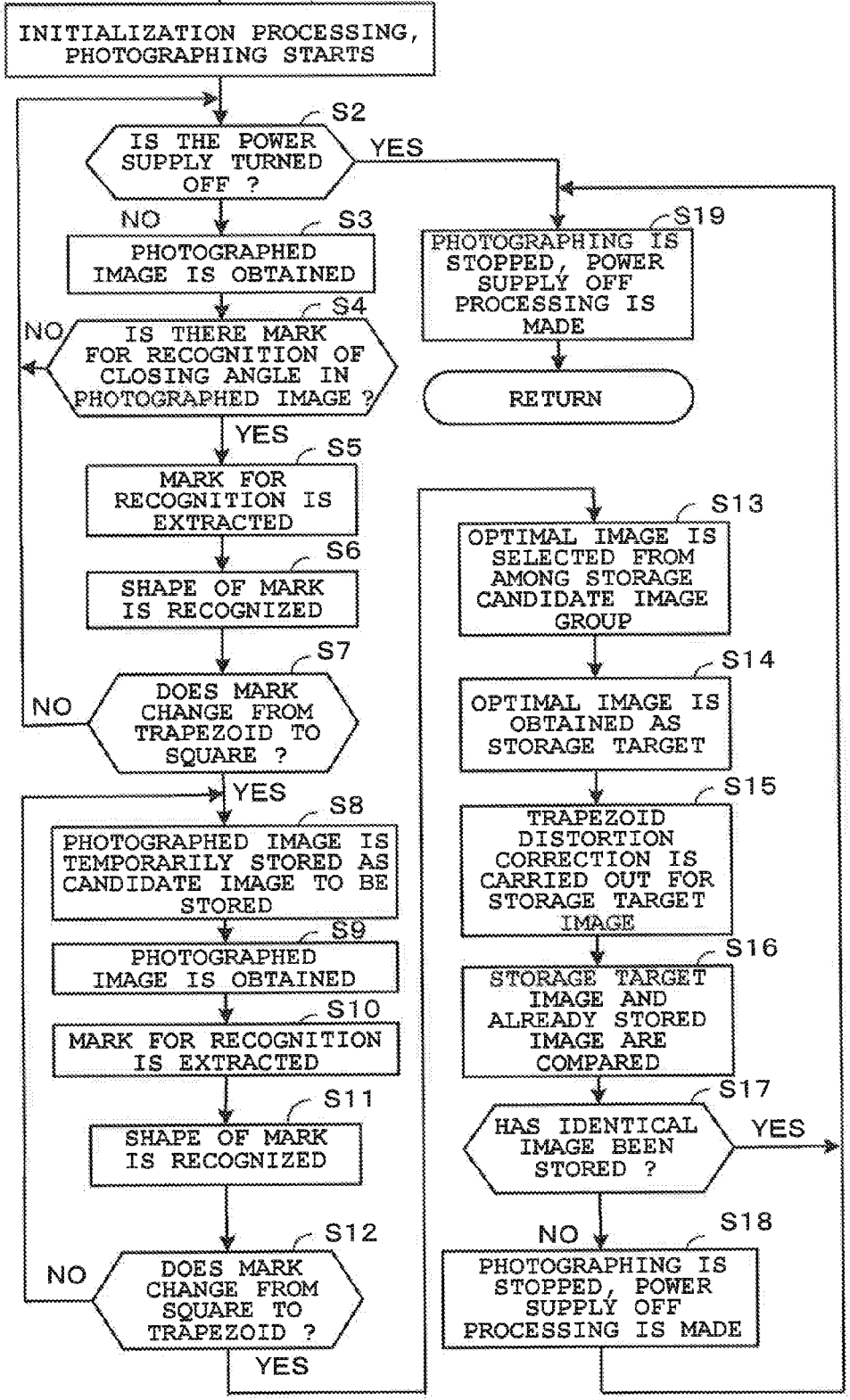
FIG. 4 is a flowchart illustrating the outline of operations including characteristic features according to the embodiment of the present invention, with regards to the entire operation of the tablet terminal apparatus 11.

FIG. 4 is a flowchart outlining the operation of a characteristic portion of the present embodiment from among all of the operations of the tablet terminal apparatus 11, which is started upon the activation of the power supply. First, after executing the initialization processing in which a memory is cleared in response to an operation to activate the power supply (power supply ON operation) and setting photographing conditions such as focusing and exposure in accordance with the optimal angle for photographing (approximately 110 degrees), the control section 1 operates the imaging section 6 and starts photographing (Step S1). Then, the control section 1 examines whether a power supply OFF operation has been carried out (Step S2). When the power supply OFF operation has not been carried out (Step S2, NO), the control section 1 obtains one frame of the photographed image from the imaging section 6 (Step S3) and examines the presence and absence of the mark 14 (indicator) for recognition of the closing angle by analyzing the photographed image (Step S4).

Here, when the mark 14 for recognition of the closing angle cannot be recognized (Step S4, NO), the control section 1 returns to the aforementioned Step S2. When the mark 14 for recognition of the closing angle appears in the photographed image, and is successfully recognized (Step S4, YES), the control section 1 extracts the mark 14 from the photographed age (Step S5). Then, the control section 1 recognizes the photogenic state of the mark 14 (the shape of the mark) (Step S6), and examines whether the shape of the mark 14 has been changed from the trapezoid to the square (Step S7).

Figure 5:
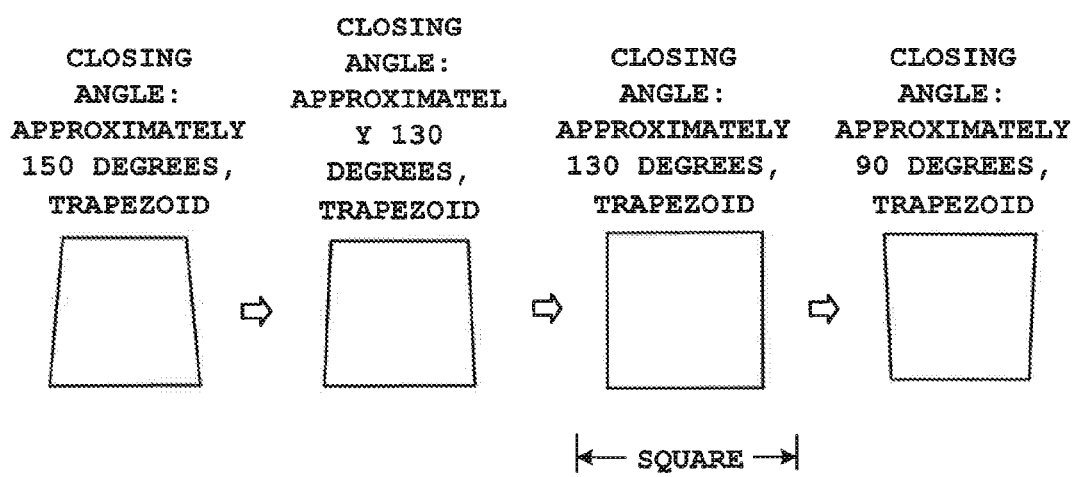
FIG. 5 is a diagram illustrating a conceptual state where the photogenic state (shape) of a mark 14 for recognition of a closing angle in the photographed image changes in proportion to the closing angle between the first case 13a and the second case 13b.

FIG. 5 is a diagram illustrating a conceptual state where the photogenic state (shape) of the mark 14 for recognition of the closing angle in a photographed image changes in proportion to the closing angle between the first case 13a and the second case 13b, and illustrating the photogenic state (shape) of the mark 14 in cases where the closing angle between the first case 13a and the second case 13b is approximately 150 degrees, approximately 130 degrees, approximately 110 degrees, and approximately 90 degrees. Here, the shape of the mark 14 for recognition of the closing angle is recognized as the trapezoid in the case where the closing angle is equal to or higher than approximately 150 degrees or in the range from approximately 150 degrees to approximately 130 degrees. However, the shape of the mark 14 for recognition of the closing angle is recognized as the square in the case where the closing angle is approximately 110 degrees, and recognized as an inverted trapezoid in the case where the closing angle is approximately 90 degrees. Accordingly, when the shape of the mark 14 is recognized as the square, the closing angle is in the range of plus or minus α with respect to 110 degrees, in which 110 degrees serve as an optimal angle suitable for photographing the read target medium 12.

Here, when change in shape from the trapezoid to the square is not recognized as the change of the shape of the mark 14 (Step S7, NO), the control section 1 judges that the closing angle is equal to or higher than approximately 110 degrees such as approximately 130 degrees and approximately 150 degrees, and returns to the aforementioned Step S2. When change in shape from the trapezoid to the square is recognized (Step S7, YES), the control section 1 allows the workspace memory 3b to temporarily store the corresponding photographed image as a candidate image to be stored (Step S8). Then, the control section 1 obtains the photographed image from the imaging section 6 (Step S9), extracts the mark 14 from the photographed image (Step S10), and recognizes the photogenic state (shape of mark) of the mark 14 (Step S11). Here, the control section 1 examines whether the change in shape from the square to the trapezoid has been recognized as the change of the shape of the mark 14 (Step S12). When the shape of the mark 14 remains the square (Step S12, NO), the control section 1 returns to the aforementioned Step S8, and repeats the operation to temporarily store the corresponding photographed image as a candidate image to be stored.

Also, when change in shape from the square to the trapezoid is recognized as the change of the shape of the mark 14 (Step S12, YES), the control section 1 selects, from among a storage candidate image group temporarily stored in the workspace memory 3b, a photographed image corresponding to, for example, an intermediate position of the storage candidate image group (image photographed at the closing angle of 110 degrees) as an optimal image (Step S13). Note that the way of selecting the image is not limited to this and may be arbitrarily determined. Also, a composite image created by a plurality of candidate images to be stored being overlapped with each other while being adjusted in their positions may be applied as the optimal image. Next, the control section 1 determines the optimal image as a storage target image (Step S14) and performs correction processing of trapezoid distortion with respect to the storage target image (Step S15). In this case, the trapezoid distortion correction is carried out corresponding to the angle 110 degrees. That is, at Step S15, the extent (degree) of distortion included in the storage target image photographed at the closing angle of 110 degrees is assumed in advance, and the correction processing to correct the storage target image to a rectangular image having no trapezoid distortion is carried out.

Next, the control section 1 compares the corrected storage target image with an image that has already been stored in the SD card or the like in the storing section 3 (Step S16) and examines whether an image identical to the storage target image has already been stored, that is, whether the storage target image has already been stored (Step S17). When the storage target image has already been stored (Step S17, YES), the control section 1 proceeds to Step S19, and stops the operation of the imaging section 6 and performs processing for turning off the power supply. Also, when the storage target image has not been stored (Step S17, NO), the control section 1 proceeds to Step S19 after performing the processing for storing the storage target image in the SD card or the like in the storing section 3 (Step S18), stops the operation of the imaging section 6, and performs the processing for turning off the power supply.

As described above, in the state where the read target medium 12, which is a read target, has been placed on the first case 13a constituting the binder 13 that is openable to be in an unfolded state, when a predetermined indicator on the first case 13a side is photographed by the imaging section 6 provided in the second case 13b, the tablet terminal apparatus 11 according to the embodiment of the present invention recognizes the indicator by analyzing the photographed image and judges whether or not the first case 13a and the second case 13b have been closed into a predetermined state based on the recognition results. When the first case 13a and the second case 13b have been closed to the predetermined state, the tablet terminal apparatus 11 judges that the photographed image from the imaging section 6 is a storage target. Accordingly, the read target medium 12 placed on the side of either case can securely be photographed merely by carrying out the essential operation of closing the first case 13a and the second case 13b without a specific operation, which makes it possible to prevent a user from forgetting to photograph.

Also, the tablet terminal apparatus 11 recognizes the photogenic state of the indicator which changes in proportion to the closing state between the first case 13a and the second case 13b, and judges whether or not the first case 13a and the second case 13b have been closed to a predetermined state, based on the photogenic state. Accordingly, the closing state can readily be judged based on the change of the photogenic state of the indicator without providing an exclusive sensor to detect the closing angle.

Moreover, the tablet terminal apparatus 11 recognizes the shape of the indicator as the photogenic state of the indicator and judges whether or not the first case 13a and the second case 13b have been closed into the predetermined state based on whether or not the shape of the indicator has been turned into a predetermined shape. Accordingly, the closing state can readily be judged based on the change in the shape of the indicator.

Furthermore, the predetermined indicator is a predetermined mark provided on the first case 13a. When the shape of the mark is recognized, the tablet terminal apparatus 11 judges whether or not the shape of the mark is a predetermined shape (for example, square) and judges whether or not the first case 13a and the second case 13b have been closed into the predetermined state (for example, the closing angle is approximately 110 degrees). Accordingly, the closing state can readily be judged based on the change in the shape of the mark.

Still further, the trapezoid distortion correction for a photographed image determined as a storage target is carried out corresponding to a predetermined closing state. Accordingly, an image having no distortion can be stored even when photographing is performed in a predetermined closing state.

Yet still further, on condition that a photographed image determined as a storage target and an image that has already been stored are not identical, the storage target image is newly stored. Accordingly, the duplication and storage of the same image can securely be prevented.

Figure 6A:
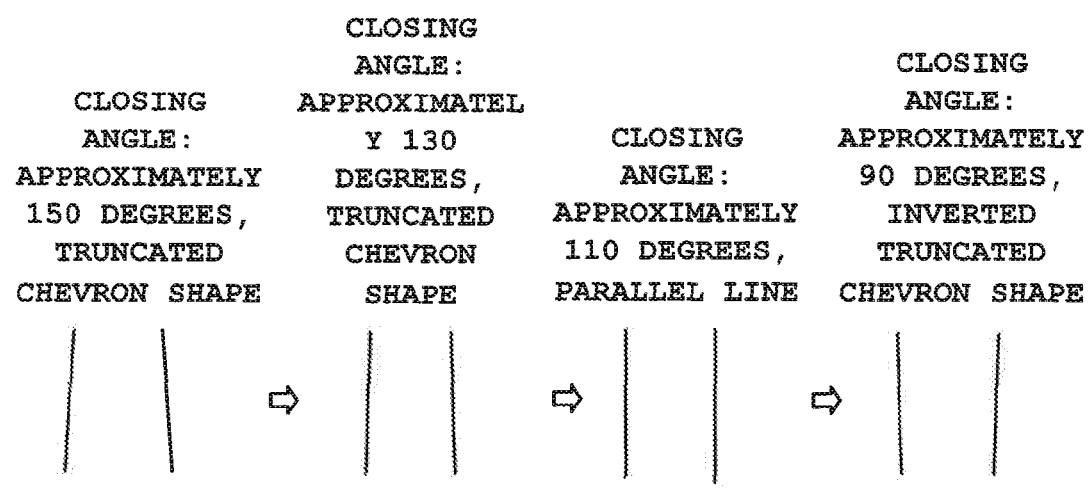
FIGS. 6A and 6B are diagrams to describe other examples of the mark 14 for recognition of the closing angle as modification of the present invention.

In the aforementioned embodiment of the present invention, when the shape of the mark 14 for recognition of the closing angle in a photographed image is changed from the trapezoid to the square, the photographed image is obtained as a candidate image to be stored. However, the shape of the mark 14 may be arbitrarily determined. For example, two lines which are formed in "truncated chevron shape" may be applied. FIG. 6A is a diagram illustrating the conceptual state where the photogenic state (shape) of the mark 14 (two lines) for recognition of the closing angle in a photographed image changes in proportion to the closing angle, and illustrating the photogenic state (shape) of the mark 14 (two lines) in a case where the closing angle between the first case 13a and the second case 13b is approximately 150 degrees, approximately 130 degrees, approximately 110 degrees, and approximately 90 degrees. Here, the shape of the mark 14 for recognition of the closing angle is recognized as "truncated chevron shape" in the case where the closing angle is equal to or higher than approximately 150 degrees or in the range from approximately 150 degrees to approximately 130 degrees. However, the shape of the mark 14 for recognition of the closing angle is recognized as "parallel line" in the case where the closing angle is approximately 110 degrees, and recognized as an "inverted truncated chevron shape" in the case where the closing angle is approximately 90 degrees.

Figure 6B:
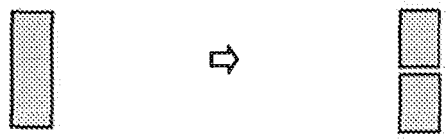

Further, FIG. 6B is a diagram illustrating another shape of the mark 14 for recognition of the closing angle, in which the shape of the mark is recognized based on whether a blank portion appears in the intermediate portion of a black line and the black line is divided in two at the intermediate portion thereof, or the black line remains undivided. The example illustrates the photogenic state (shape) of the mark 14 (black line) for recognition of the closing angle in the case where the closing angle between the first case 13a and the second case 13b is approximately 130 degrees and approximately 110 degrees. The shape of the mark is represented as the undivided black line when the closing angle is approximately 130 degrees, and the shape of the mark is represented as the black line whose intermediate portion has the blank portion which divides the black line in two, when the closing angle is approximately 110 degrees, Besides, the shape of the mark 14 for recognition of the closing angle can be arbitrarily determined.

In the aforementioned embodiment of the present invention, whether or not the closing angle between the first case 13a and the second case 13b have been closed into the predetermined state is judged based on the change in the shape of the mark 14 for recognition of the closing angle. However, the present invention is not limited thereto. Whether or not the closing angle between the first case 13a and the second case 13b have been closed into the predetermined state may be judged based on the change in the magnitude or position of the mark 14. Further, the combination of two or more changes in the shape, magnitude, and position of the mark 14 for recognition of the closing angle may be applied for recognition. Thus, it is not limited to the change in the shape of the mark 14 for recognition of the closing angle and, by recognizing the change in the magnitude or position of the mark 14, the change of the closing angle can securely be recognized.

Also, in the aforementioned embodiment of the present invention, the mark 14 for recognition of the closing angle is arranged at a surface one end central portion of the first case 13a (surface right end central portion in FIG. 2), but the position of the mark 14 is not limited to this and the mark 14 may be arranged in a corner portion of the first case 13a. Also, the embodiment is not limited to the case where the mark 14 is mounted on the first case 13a, but can be applied to a case where the mark is be printed in the read target medium 12, or a seal with the mark is affixed to the read target medium 12.

Figure 7:
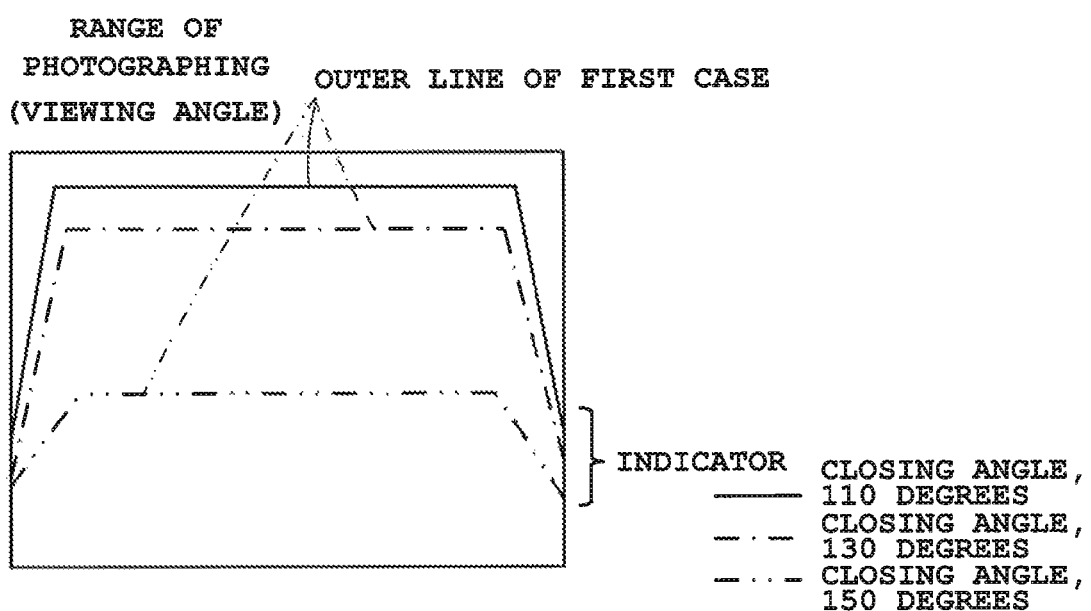
FIG. 7 is a diagram to describe another example of an indicator besides the mark as modification of the present invention.

Moreover, in the aforementioned embodiment of the present invention, the mark is exemplified as the indicator for recognition of the closing angle, but one portion of the first case 13a may be applied as the indicator. FIG. 7 is a diagram illustrating a photographed image to describe the case where one portion of the first case 13a is used as the indicator for recognition of the closing angle. In this case, the indicator is the end portion of the first case 13a, and the control section 1 recognizes the position of the end portion of the first case 13a, as the way of veering of the end portion when the end portion of the first case 13a comes off the viewing angle of the imaging section 6. The control section 1 judges whether or not the first case 13a and the second case 13b have been closed into the predetermined state based on whether or not the way of veering of the end portion is a predetermined way of veering.

The example illustrated is a diagram illustrating a state where the photogenic state of the outer line of the first case 13a changes in proportion to the closing angle between the first case 13a and the second case 13b. In the diagram, a solid line illustrating the outer line of the first case 13a represents the case where the closing angle is approximately 110 degrees, a dashed-dotted line represents the case where the closing angle is approximately 130 degrees, and a dashed doubled-dotted line represents the case where the closing angle is approximately 150 degrees. Thus, the way of veering of the end portion in the case where the end portion of the first case 13a comes off the viewing angle of the imaging section 6, that is, the position where the end portion of the first case 13a intersects the line of the viewing angle is changed in accordance with the closing angle. In this case, in the longitudinal direction of the photographed image, the outer line of the first case 13a comes closer to the central portion in the longitudinal direction in the order of approximately 110 degrees, approximately 130 degrees, and approximately 150 degrees with regards to the closing angle. In the case of approximately 110 degrees, the outer line of the first case 13a comes closest to the central portion.

As just described, the control section 1 judges whether or not the first case 13a and the second case 13b have been closed into the predetermined state, based on the way of veering of the end portion when the end portion of the first case 13a comes off the viewing angle of the imaging section 6. Accordingly, as in the case of the above-described embodiment, the read target medium 12 placed on the side of either case can securely be photographed merely by carrying out the essential operation of closing the first case 13a and the second case 13b without a specific operation, which makes it possible to prevent a user from forgetting to photograph and makes it unnecessary to provide the mark and the like.

Note that the way of veering of the end portion in the case where the end portion of the first case 13a comes off the viewing angle of the imaging section 6 in not limited to the case where the change in position of the intersection between the end portion of the first case 13a and the line of the viewing angle is recognized, and the gradient (gradient with respect to the line of the viewing angle) of the outer line of the end portion of the first case 13a may be recognized, or the shape of the end portion of the first case 13a may be recognized.

Also, in the aforementioned embodiment of the present invention, whether or not the first case 13a and the second case 13b have been closed into the predetermined state is judged based on the change in the shape, magnitude, or position of the mark 14 for recognition of the closing angle. However, it is not limited to the change in the shape, magnitude, or position of the mark 14, and whether or not the first case 13a and the second case 13b have been closed into the predetermined state may be judged based on whether or not the mark 14 is in focus, or in other words, whether or not focusing is adjusted when the mark 14 is photographed by the imaging section 6. In this case, at Step S6 and Step S11 in FIG. 4, "judge whether or not mark is in focus" is applied. At Step S7, "Is mark in focus?" is applied. At Step S12, "Does mark come out of focus?" is applied.

Moreover, in the aforementioned embodiment, the present invention is applied to the tablet terminal apparatus 11 as an information processing apparatus. However, the present invention is not limited thereto. The present invention may be applied to personal computers with a camera function, PDA (personal, portable information communication equipment), digital cameras, music players, or the like, or, as a matter of course, may be a digital camera itself.

Furthermore, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

This application is based upon and claims the benefit of priority from Japanese patent application No. P2012-139535, filed on Jun. 21, 2012, the disclosure of which is incorporated herein in its entirety by reference.

While the present invention has been described with reference to the preferred embodiments, it is intended that the invention be not limited by any of the details of the description therein but includes all the embodiments which fall within the scope of the appended claims.

The invention claimed is:

1. An information processing apparatus that is openable by a first case and a second case being unfolded, comprising:
    an imaging device which is provided in the second case and opposed to the first case, the first case being configured to have a read target paper medium placed thereon; and
    a processor which executes a program stored in a memory to perform functions comprising:
    when a predetermined indicator at a first case side of the information processing apparatus is photographed by the imaging device, recognizing the predetermined indicator by analyzing a photographed image;
    judging whether or not the first case and the second case have been closed into a predetermined state, based on a result of recognition of the indicator; and
    determining the photographed image taken by the imaging device as a storage target, when it is judged that the first case and the second case have been closed into the predetermined state,
    wherein the predetermined indicator comprises a predetermined mark provided on the paper medium placed on or in the first case,
    wherein recognizing the predetermined indicator comprises recognizing whether or not the mark photographed by the imaging device is in focus, and
    wherein it is judged whether or not the first case and the second case have been closed into the predetermined state based on whether or not the mark has been recognized to be in focus.

2. The information processing apparatus according to claim 1, wherein recognizing the predetermined indicator comprises recognizing a photogenic state of the indicator which changes in proportion to a closing state between the first case and the second case, and
    wherein it is judged whether or not the first case and the second case have been closed into the predetermined state, based on the photogenic state of the indicator.

3. The information processing apparatus according to claim 2, wherein recognizing the predetermined indicator comprises recognizing a shape or position of the indicator as the photogenic state of the indicator, and
    wherein it is judged whether or not the first case and the second case have been closed into the predetermined state, based on whether or not the shape or the position of the indicator has turned into a predetermined shape or moved to a predetermined position.

4. The information processing apparatus according to claim 1,
    wherein recognizing the predetermined indicator comprises recognizing at least one of a shape, a position, and a magnitude of the mark as a state of the mark, and
    wherein it is judged whether or not the first case and the second case have been closed into the predetermined state, based on whether or not the state of the mark is a predetermined state.

5. The information processing apparatus according to claim 1, wherein the predetermined indicator comprises an end portion of the first case in the photographed image taken by the imaging section,
    wherein recognizing the predetermined indicator comprises recognizing at least one of a position and a gradient of the end portion of the first case, as a way of veering of the end portion when the end portion of the first case comes out of a viewing angle of the imaging section, and
    wherein it is judged whether or not the first case and the second case have been closed into the predetermined state, based on whether or not the way of veering of the end portion of the first case is a predetermined way of veering.

6. The information processing apparatus according to claim 1, wherein the functions performed by the processor further comprise:
    performing distortion correction for the photographed image determined as the storage target, in proportion to the predetermined closing state.

7. The information processing apparatus according to claim 1, wherein the functions performed by the processor further comprise:
    newly storing the photographed image determined as the storage target in a memory if the photographed image determined as the storage target is not identical to an image that has already been stored.

8. A non-transitory computer-readable medium having stored thereon a program that is executable by a computer provided to an information processing apparatus that is openable by a first case and a second case being unfolded, an imaging device being provided in the second case and opposed to the first case, and the first case being configured to have a read target paper medium placed thereon, the program being executable by the computer to perform functions comprising:
    recognizing a predetermined indicator by analyzing a photographed image when the predetermined indicator at a first case side of the information processing apparatus is photographed by the imaging device;
    judging whether or not the first case and the second case have been closed into a predetermined state, based on a result of recognition of the indicator; and
    determining the photographed image taken by the imaging device as a storage target, when the first case and the second case are judged to have been closed into the predetermined state,
    wherein the predetermined indicator comprises a predetermined mark provided on the paper medium placed on or in the first case,
    wherein recognizing the predetermined indicator comprises recognizing whether or not the mark photographed by the imaging device is in focus, and
    wherein it is judged whether or not the first case and the second case have been closed into the predetermined state based on whether or not the mark has been recognized to be in focus.

9. The information processing apparatus according to claim 2,
    wherein recognizing the predetermined indicator comprises recognizing at least one of a shape, a position, and a magnitude of the mark as a state of the mark, and wherein it is judged whether or not the first case and the second case have been closed into the predetermined state, based on whether or not the state of the mark is a predetermined state.

10. The information processing apparatus according to claim 3, wherein recognizing the predetermined indicator comprises recognizing at least one of a shape, a position, and a magnitude of the mark as a state of the mark, and wherein it is judged whether or not the first case and the second case have been closed into the predetermined state, based on whether or not the state of the mark is a predetermined state.

11. An information processing apparatus that is openable by a first case and a second case being unfolded, comprising:

an imaging device which is provided in the second case and opposed to the first case, the first case being configured to have a read target paper medium placed thereon; and a processor which executes a program stored in a memory to perform functions comprising:

when a predetermined indicator on at a first case side of the information processing apparatus is photographed by the imaging device, recognizing that the predetermined indicator is a predetermined mark provided on the paper medium placed on or in the first case, by analyzing a photographed image;

judging whether or not the first case and the second case have been closed into a predetermined state, based on whether or not the recognized mark is in focus; and determining the photographed image taken by the imaging device as a storage target, when it is judged that the first case and the second case have been closed into the predetermined state.

12. A non-transitory computer-readable medium having stored thereon a program that is executable by a computer provided to an information processing apparatus that is openable by a first case and a second case being unfolded, an imaging device being provided in the second case and opposed to the first case, and the first case being configured to have a read target paper medium placed thereon, the program being executable by the computer to perform functions comprising:

when a predetermined indicator on at a first case side of the information processing apparatus is photographed by the imaging device, recognizing that the predetermined indicator is a predetermined mark provided on the paper medium placed on or in the first case, by analyzing a photographed image;

judging whether or not the first case and the second case have been closed into a predetermined state, based on whether or not the recognized mark is in focus; and determining the photographed image taken by the imaging device as a storage target, when it is judged that the first case and the second case have been closed into the predetermined state.

* * * * *